United States Patent
Beabout

Patent Number: 5,688,104
Date of Patent: Nov. 18, 1997

[54] AIRFOIL HAVING EXPANDED WALL PORTIONS TO ACCOMMODATE FILM COOLING HOLES

[75] Inventor: Brian K. Beabout, Coventry, Conn.

[73] Assignee: United Technologies Corporation, Hartford, Conn.

[21] Appl. No.: 158,073

[22] Filed: Nov. 24, 1993

[51] Int. Cl.⁶ .................................................. F01D 5/18
[52] U.S. Cl. .................................... 415/115; 416/97 R
[58] Field of Search .................................. 415/115, 116; 416/96 R, 97 R; 60/757

[56] References Cited

U.S. PATENT DOCUMENTS

| | | | |
|---|---|---|---|
| 3,533,711 | 10/1970 | Kercher | 416/90 |
| 3,540,811 | 11/1970 | Davis | 416/90 |
| 3,542,486 | 11/1970 | Kercher et al. | 416/90 |
| 3,801,218 | 4/1974 | Moore | 416/97 R |
| 4,026,659 | 5/1977 | Freeman, Jr. | 415/115 |
| 4,162,136 | 7/1979 | Parkes | 416/97 R |
| 4,183,716 | 1/1980 | Takahara et al. | 416/97 R |
| 4,507,051 | 3/1985 | Lesgourgues et al. | 416/97 R |
| 4,601,638 | 7/1986 | Hill et al. | 416/97 R |
| 4,664,597 | 5/1987 | Auxier et al. | 416/97 R |
| 4,684,323 | 8/1987 | Field | 415/115 |
| 4,770,608 | 9/1988 | Anderson et al. | 415/115 |
| 4,859,147 | 8/1989 | Hall et al. | 416/97 R |
| 5,096,379 | 3/1992 | Stroud et al. | 415/115 |
| 5,246,340 | 9/1993 | Winstanley et al. | 416/97 R |
| 5,271,715 | 12/1993 | Zelesky et al. | 416/96 R |
| 5,281,084 | 1/1994 | Noe et al. | 415/115 |
| 5,356,265 | 10/1994 | Kercher | 416/97 R |
| 5,378,108 | 1/1995 | Zelesky | 415/115 |

FOREIGN PATENT DOCUMENTS

| | | | |
|---|---|---|---|
| 59-173502 | 10/1984 | Japan | 416/97 R |
| 2262314 | 6/1993 | United Kingdom | 415/115 |

Primary Examiner—Michael J. Carone
Assistant Examiner—Theresa M. Wesson

[57] ABSTRACT

An internally cooled airfoil includes film cooling holes extending through an expanded section of the wall. Various construction details are developed which provide long film cooling holes resulting in convective cooling and film cooling of the outer surface of the airfoil downstream of the cooling hole. In a particular embodiment, the airfoil includes a wall having an expanded section and a canted shaped cooling hole. The shaped cooling hole includes a metering section having a length $L_2$ and a diffusing section having a length $L_3$. The expanded section has a thickness $T_e$, measured along the direction of the cooling hole, sufficient to accommodate the total length $L_1$ of the cooling hole.

4 Claims, 2 Drawing Sheets

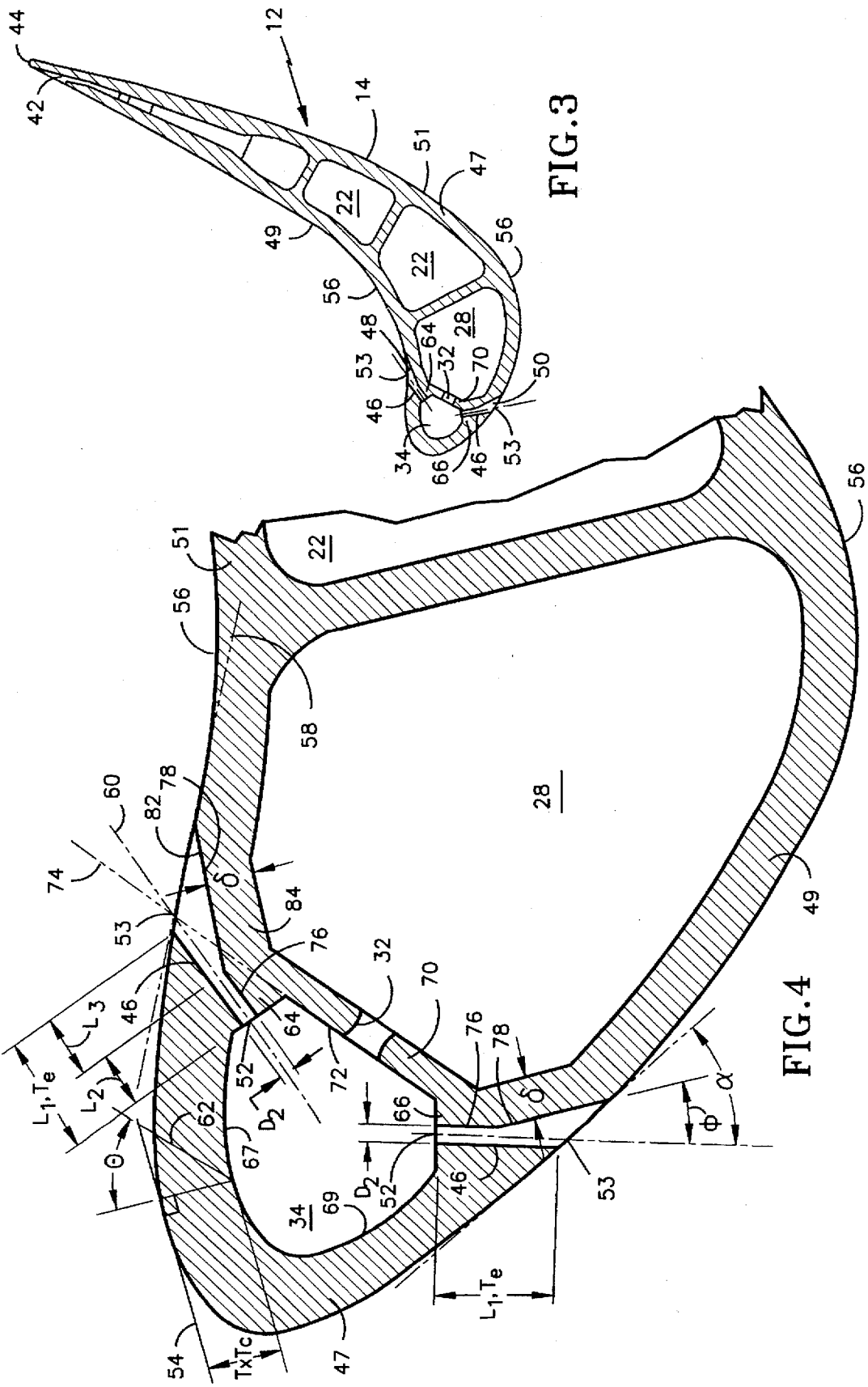

AIRFOIL HAVING EXPANDED WALL PORTIONS TO ACCOMMODATE FILM COOLING HOLES

TECHNICAL FIELD

This invention relates to airfoils for gas turbine engines, and more particularly to airfoils having film cooling holes for ejecting from the airfoil a film of cooling fluid over the external surface of the airfoil.

BACKGROUND OF THE INVENTION

The output of gas turbine engines, as measured in thrust for aircraft applications, is directly related to the combustor outlet temperature. In the combustor, fuel is mixed with compressed oxidant and the mixture is combusted. The higher the combustor outlet temperature, the greater the energy level of the products of combustion and the greater the work (i.e. thrust) the gas turbine engine is capable of generating. The hot gases of combustion are directed into sequential arrays of rotating blades and stationary vanes which comprise the turbine section. In the turbine section, each stationary array of vanes direct the flow of combustion products to engage one of the arrays of blades. Energy within the flowing fluid is transferred to each array of blades causing them to rotate. Each array of blades is attached to a rotatable shaft from which energy may be extracted.

For practical purposes, the combustor outlet temperature is limited by the material temperature limitations of the structure within the turbine section. Exposure of the turbine section components to excessive temperature may lead to burning of the components. In addition, the maximum allowable stress within the turbine components is constrained by the temperature of those components. Higher combustor outlet temperature requires higher strength components to accommodate the degradation in allowable stress. This is especially significant for highly stressed components such as rotating blades.

The common method to extend the operation temperature range of the turbine section is to flow cooling fluid into the turbine section. Typically, this cooling fluid is compressor fluid which bypasses the combustion process and is therefore at a significantly lower temperature but higher pressure. The cooling fluid is flowed around and through various turbine components to remove heat from those components. Eventually the cooling fluid is dumped into the flow path of the turbine section. A drawback to using compressor fluid as a cooling fluid is a reduced operating efficiency of the gas turbine engine. This results from diverting a portion of the compressor fluid around a portion of the turbine section. This cooling fluid does not engage the bypassed portion of the turbine section and therefore does not transfer any significant energy to those portions.

Blades and vanes exposed to the extreme temperatures are typically hollow to permit cooling fluid to flow through them. The hollow portion may include combinations of multiple passages, impingement baffles, trip strips and pedestals. These devices maximize the heat transfer between the cooling fluid and the airfoil to minimize the amount of cooling fluid required and its effect on gas turbine engine operating efficiency.

Another common device used to provide cooling is film cooling holes that extend between the hollow core of the airfoil and the external surface of the airfoil. These cooling holes produce a film of cooling fluid that flows downstream of the cooling hole. The film of cooling fluid insulates the external surface of the airfoil from the hot gases flowing within the turbine section.

A recent development in the art of film cooling holes is the 'shaped' cooling hole. An example of such a cooling hole is described in U.S. Pat. No. 4,664,597, issued to Auxier et al and entitled "Coolant Passages with Full Coverage Film Cooling Slot". The cooling hole described therein includes a metering portion and a diffusing portion in series flow relationship. The plurality of cooling holes are aligned to form a slot and are angled to direct a flow of cooling fluid with a component of velocity at a shallow angle relative to the external surface of the airfoil. The cooling fluid exiting the cooling holes becomes entrained in the boundary layer downstream of the cooling hole to form a film of cooling fluid over the external surface.

A limitation to the use of shaped film cooling holes is the length required for the cooling hole. The thickness of the airfoil wall must accommodate both a metering portion and a diffusing portion of sufficient lengths and widths to result in a highly effective film of cooling fluid exiting the cooling hole. In addition, the fabrication of the cooling holes requires additional material to be available to account for manufacturing tolerances. It is desirable, however, to have the airfoil wall as thin as possible to reduce weight and to maximize the internal surface of the airfoil available for heat transfer.

The above art notwithstanding, scientists and engineers under the direction of Applicant's Assignee are working to develop fluid cooled turbine airfoils that have shaped film cooling holes without significantly increasing the wall thickness of the airfoil near the area of concern.

DISCLOSURE OF THE INVENTION

According to the present invention, an airfoil includes a wall having an expanded section that accommodates the longitudinal length of a cooling hole extending through the wall. The cooling hole ejects cooling fluid over the external surface to provide an insulating layer of cooling over the external surface downstream of the cooling hole.

According to a specific embodiment of the present invention, an airfoil includes a wall having a pressure wall, a suction wall and an expanded section, a forward cavity, an aft cavity, a rib extending between the pressure wall and suction wall and separating the two cavities, and a cooling hole extending through the expanded section of the wall and disposed laterally outward of the rib. The expanded section is immediately forward of and chordwise continuous with the rib. The expanded section of the wall has a thickness, measured along the longitudinal axis of the cooling hole, sufficient to accommodate the length of the cooling hole. The cooling hole has an inlet in the forward cavity and an outlet extending downstream of the rib for ejecting cooling fluid over the aft cavity.

According to another specific embodiment, the cooling hole has a longitudinal axis and includes a metering section and a diffusing section in series flow relationship. The metering section has an effective diameter $D_2$ and a longitudinal length $L_2$, wherein $L_2 \geq 2 \cdot D_2$. The diffusing section has a longitudinal length $L_3$. The expanded section of the wall has a thickness $T_e$, measures along the longitudinal axis of the cooling hole, equal to the total length $L_1=(L_2+L_3)$ of the cooling hole.

A principle feature of the present invention is the expanded section of the wall. A feature of the specific embodiment is the location of the expanded section adjacent to the rib separating the cavities. Another feature is the outlet extending downstream of the rib. A feature of another specific embodiment is the shaped film cooling hole that extends through the expanded section of the wall.

A primary advantage of the present invention is the effective cooling of the airfoil which results from flowing cooling fluid through the cooling hole and ejecting it over the external surface of the airfoil. Cooling fluid flowing through the cooling hole provides convective cooling of the region of the airfoil adjacent to the cooling hole. Having the cooling hole extend through the expanded section of the wall permits the cooling hole to be maximized at a specific location to thereby maximize the amount of convective cooling occurring. Cooling fluid exiting the cooling hole provides a film of cooling fluid over the external surface of the airfoil.

An advantage of the particular embodiment is the efficient use of cooling fluid as a result of the use of cooling fluid from a forward cavity to provide cooling to an aft cavity. The location of the cooling hole and expanded section adjacent to the rib permits the cooling fluid in the cooling hole to convectively cool the upstream end of the aft cavity and the ejected cooling fluid to film cool the surface of the aft cavity. A further advantage of the specific embodiment is the ease of manufacturing as a result of having the expanded section integral to and continuous with the rib and wall interface. Another advantage of the specific embodiment is the effective film cooling as a result of the use of shaped cooling holes. The shaped cooling holes are effective at entraining the exiting cooling fluid in the boundary layer over the external surface. The expanded section of the wall provides sufficient thickness to accommodate the metering section and the diffusing section of the shaped cooling hole without increasing the thickness of the majority of the wall and thereby the weight of the airfoil.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 3 is a cross-sectional view, taken along line 3—3 of FIG. 2, showing the location of the expanded sections of the wall and the shaped cooling holes that extend through the expanded sections.

FIG. 4 is a sectional view of the forward and aft cavities to show the dimensions of the cooling hole metering section and diffusing section.

BEST MODE FOR CARRYING OUT THE INVENTION

Figure 2:
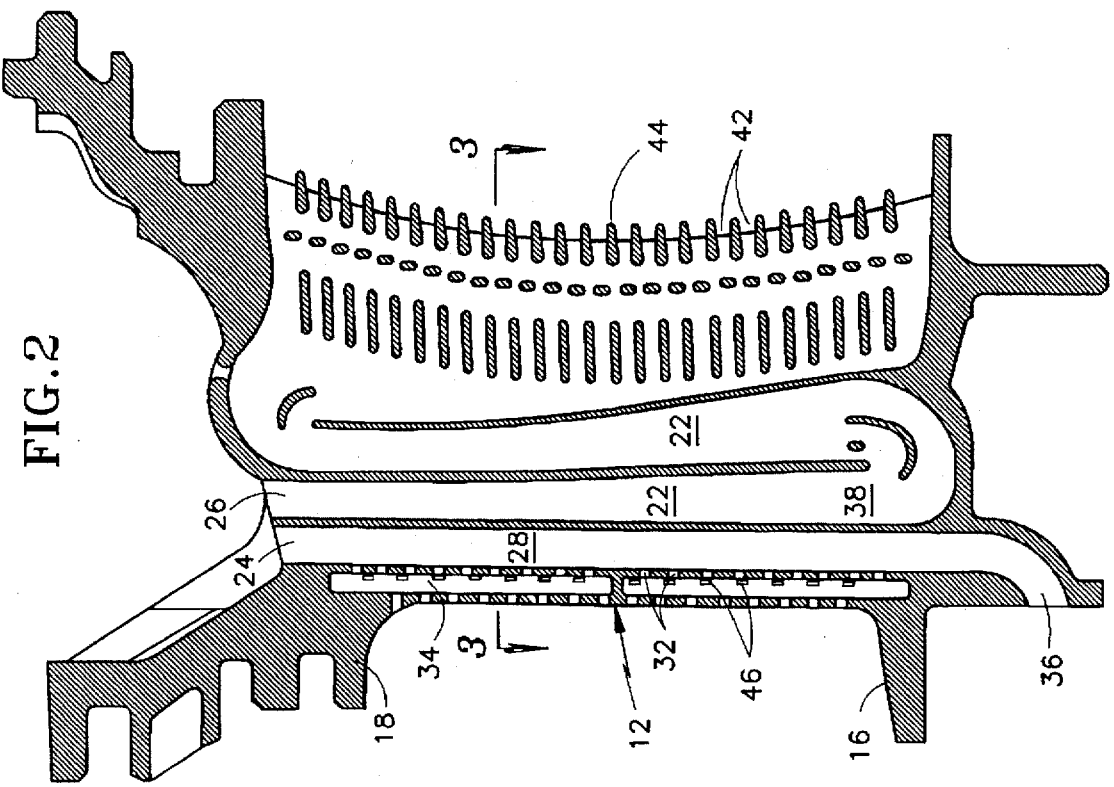
FIG. 2 is a side view of the gas turbine engine vane, partially cut away to illustrate the internal cooling passages of the vane.
Figure 1:
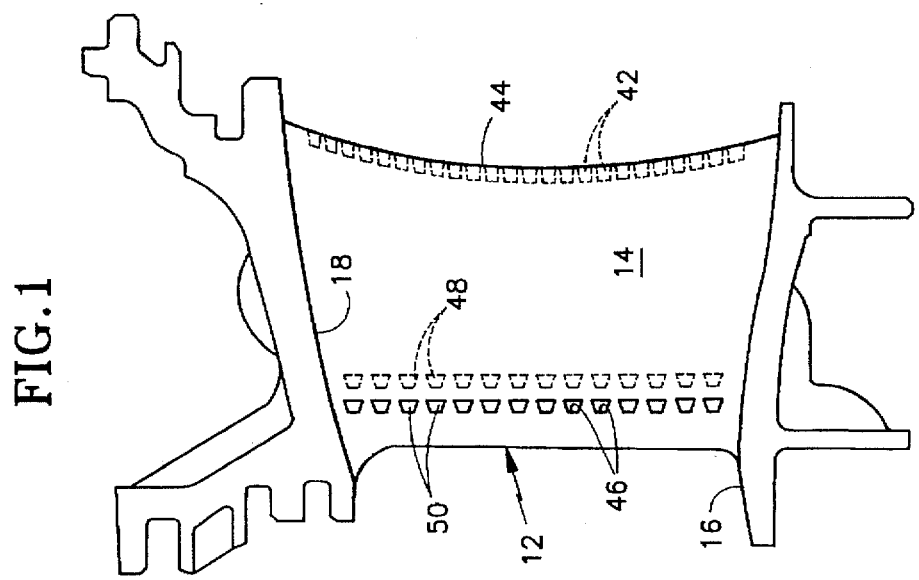
FIG. 1 is a side view of a gas turbine engine vane.

Illustrated in FIGS. 1 and 2 is a turbine vane 12 having a airfoil shaped body 14, an inner platform 16, and an outer platform 18. The body 14 includes a plurality of cooling passages that extend through the hollow body 14 to permit cooling fluid to flow through the vane 12. Cooling fluid enters the vane 12 through one of two apertures 24,26 in the outer end of the vane 12. Cooling fluid entering the first aperture 24 flows into an aft cavity 28. A portion of this cooling fluid within the aft cavity 28 flows through a plurality of impingement holes 32 and into a forward cavity 34. The remainder of the cooling fluid within the aft cavity 28 flows inward and exits the vane 12 through an ejector 36 located inward of the inner platform 16. Cooling fluid entering the second aperture 26 flows into a serpentine passage 38 that winds through the body 14. This cooling fluid exits the vane 12 through a series of outlets 42 spaced along the trailing edge 44 of the vane 12.

Cooling fluid in the forward cavity 34 exits the vane 12 through a series of cooling holes 46 in the body 14. As shown in FIGS. 3 and 4, each of these cooling holes 46 extends through a wall 47 of the body 14. A first set of cooling holes 48 is disposed spanwise in the wall 47 forming the pressure side 49 of the vane 12. A second set of cooling holes 50 is disposed spanwise in the wall 47 forming the suction side 51 of the vane 12. Each of the cooling holes 46 includes an inlet 52 and an outlet 53. The inlet 52 permits fluid communication between the forward cavity 34 and the cooling hole 46 and the outlet 53 permits fluid communication between the cooling hole 46 and external of the vane 12. The cooling hole 46 is disposed about a longitudinal axis 60 that is canted at an angle $\alpha$ relative to a tangent 54 to the outer surface 56 of the vane 12 adjacent to the outlet 53. The angle of the cooling hole 46 directs cooling fluid to flow down the outer surface 56 of the vane 12. For practical purposes, the angle $\alpha$ is subject to manufacturing limitations. In practice, cooling holes having $\alpha=35°$ have been fabricated. The cooling hole 46 has a length $L_1$, measured from the inlet 52 to the outlet 53 along the longitudinal axis 60 of the cooling hole 46. The length $L_1$ is greater than the thickness $T_x$ of the wall 47 measured perpendicular to a tangent 58 to the outer surface 56 and is greater than the thickness $T_c$ measures along a line 62 forming an angle $\Theta$ equal to $\alpha$.

The length $L_1$ of the cooling holes 46 is accommodated by having them extend through a pair of expanded sections 64,66 of the wall 47. As shown in FIG. 4, each of the expanded sections 64,66 is a portion of the wall 47 that extends inward into the forward and aft cavities 28,34. The first expanded section 64 extends spanwisely along the inner surface 67 of the wall 47 forming the pressure side 49 of the vane 12. The second expanded section 66 extends spanwisely along the inner surface 69 of the wall 47 forming the suction side 51 of the vane 12. Both expanded sections 64,66 are aligned with their corresponding set of cooling holes 48,50. The expanded sections 64,66 of the wall 47 extend inward from the wall 47 such that the expanded sections 64,66 have a thickness $T_e$, measured in the direction of the longitudinal axes 60, equal to or greater than the length $L_1$. The larger thickness of the expanded sections 64,66, relative to the wall 47 thickness adjacent to the expanded sections 64,66, permits longer length cooling holes 46 at a given angle $\alpha$ than could be achieved through the portion of the wall 47 adjacent to the expanded sections 64,66.

A rib 70 having the impingement holes 32 extends between the two expanded sections 64,66 to define a barrier between the forward cavity 34 and the aft cavity 28. The forward facing surface 72 of the rib 70 defines a plane 74. The cooling holes 46 are located to extend through this plane 74. The location of the cooling holes 46 adjacent to and extending downstream of the barrier separating the forward cavity 34 from the aft cavity 28 permits cooling fluid from the forward cavity 34 to provide additional cooling of the aft cavity 28. This forward cavity 34 cooling fluid, which provides impingement and convective cooling of the forward cavity 34, flows through the cooling holes 46 and is ejected over the outer surface 56 of the wall 47 around the aft cavity 28. Convective cooling of the wall 47 adjacent to the cooling holes 46 occurs as the cooling fluid passes through the cooling holes 46. The ejected cooling fluid forms a film of insulating fluid over the outer surface 56 of the wall 47 downstream of the outlets 52.

The combination of the forward and aft cavities 28,34, the impingement rib 70, and the cooling holes 46 through the expanded sections 64,66 provides a system for efficiently utilizing available cooling fluid. Cooling fluid entering the aft cavity 28 through the aperture 24 flows through the impingement holes 32 in the rib 70 to cool the leading edge of the vane 12. This cooling fluid then exits the forward cavity 34 through the cooling holes 46 to cool the aft cavity 28. In this way, cooling fluid entering the aft cavity 28 is buffered from the hot gases by the film of cooling fluid generated by the cooling holes 46 and heat up of the fluid flowing radially within the aft cavity 28 is minimal. Maintaining the fluid within the aft cavity 28 at a relatively cool temperature increases the heat transfer possible for impingement cooling of the leading edge and for cooling the structure adjacent to the ejector 36.

As shown in FIG. 4, each of the cooling holes 46 is a shaped cooling hole having a metering section 76 and a diffusing section 78 in series flow relationship. The metering section 76 includes the inlet 52 and has a length $L_2$ and a diameter $D_2$. The diffusing section 78 has a length $L_3$, measured from the metering section 76 to the outlet 53 along the direction of the longitudinal axis 60. The diffusing section 78 has a downstream surface 82 that is canted at an angle $\phi$ relative to the longitudinal axis 60 such that the diffusing section 78 expands in the outward direction. As is well known, fluid flowing through the diffusing section 78 decreases velocity and increases in static pressure to permit the ejected fluid to become entrained in the boundary layer of the fluid flowing over the outer surface 56 of the vane 12 downstream of the cooling holes 46. It is suggested that the length of the metering section $L_2$ be greater than or equal to twice the diameter $D_2$ of the metering section ($L_2 \geq 2 \cdot D_2$). For holes having cross-sections other than circular, it is suggested that the metering length $L_2$ be greater than or equal to twice the hydraulic diameter $H_D$ of the hole. As is well known, $H_D$ is defined as four times the cross-sectional area divided by the perimeter ($H_D=4A/P$).

To accommodate the diffusing section 78 and to provide sufficient wall material to permit manufacture of the shaped cooling hole 46, the expanded sections 64,66 include a portion 84 that extends aft of the plane 74 and adjacent to the downstream surface 82. Having the portion 84 permits the inner surfaces 67,69 of the aft cavity 28 to be distanced from the diffusing section 78 an amount $\delta$. The amount $\delta$ is predetermined to provide sufficient stand-off such that when the diffusing section 78 is formed, the risk of inadvertently penetrating through into the aft cavity 28 due to manufacturing tolerances or positioning errors is minimal.

The cooling holes may be formed in the expanded sections by electro-discharge machining (EDM) using an electrode having the shape of the passages desired. A conventional method is to form each set of cooling holes using a comb electrode comprised of a plurality of adjacent teeth. The comb is moved into the expanded section of the wall to form all the cooling holes simultaneously. Having the expanded section provides both the thickness for the hole lengths desired and additional wall material adjacent to the location of the holes to account for manufacturing tolerances.

Although illustrated in FIGS. 1–4 as a turbine vane, it should be understood that the invention is equally applicable to other types of internally cooled airfoils, such as turbine blades. In addition, the embodiment illustrated in FIGS. 1–4 includes a shaped cooling hole having a diffusing section. The invention also has benefits for cooling holes of other cross-sectional shapes that require hole lengths greater than the thickness of the wall in the direction of the cooling hole axis 60. For example, a cooling hole of constant circular cross-section may extend through a wall having an expanded section in order to maximize the convective cooling provided by the cooling fluid flowing through the cooling hole.

Although the invention has been shown and described with respect with exemplary embodiments thereof, it should be understood by those skilled in the art that various changes, omissions, and additions may be made thereto, without departing from the spirit and scope of the invention.

What is claimed is:

1. An airfoil for a gas turbine engine, the airfoil including a wall having an outer surface having a pressure side, a suction side spaced from the pressure side to define a hollow core for flowing cooling fluid therethrough, and, further including a rib disposed between the pressure side and the suction side, the rib separating a forward cavity and an aft cavity, the rib including a front surface facing into the forward cavity and defining a surface plane, and a cooling hole, the cooling hole extending through the wall and including an inlet in the hollow core and an outlet in the outer surface of the wall, the cooling hole having a hole axis extending in a direction forming an angle $\alpha$ with a tangent to the outer surface adjacent to the outlet, the cooling hole having a length ($L_1$), measured from the inlet to the outlet of the cooling hole, and diameter ($D_2$), and wherein the wall has an expanded section immediately forward of and chordwise continuous with the rib the expanded section having a thickness ($T_e$), measured along the hole axis, equal to the length ($L_1$), wherein the cooling hole extends through said expanded section such that the inlet faces into the forward cavity and the outlet is aft of the surface plane such that the cooling hole passes through the surface plane.

2. The airfoil according to claim 1, wherein the cooling hole includes a metering section and a diffusing section, the metering section having a length $L_2$ greater than twice the diameter $D_2$, the diffusing section having a length $L_3$ measured along the hole axis, and wherein $L_1=L_2+L_3$.

3. The airfoil according to claim 2, further including a second expanded section aft of the rib, the second expanded section having a surface facing into the aft cavity, the surface spaced from the diffusing section by an amount greater than or equal to a predetermined amount $\Delta$.

4. The airfoil according to claim 1, further including an impingement hole disposed in the rib, the impingement hole permitting fluid communication between the forward cavity and the aft cavity and directing a flow of cooling fluid onto the wall forward of the front surface.

* * * * *